(12) United States Patent
Aizawa

(10) Patent No.: US 10,741,826 B2
(45) Date of Patent: Aug. 11, 2020

(54) METHOD FOR MANUFACTURING ELECTRODE PLATE AND METHOD FOR MANUFACTURING SECONDARY BATTERY

(71) Applicant: SANYO ELECTRIC CO., LTD., Daito-shi, Osaka (JP)

(72) Inventor: Tatsuya Aizawa, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 183 days.

(21) Appl. No.: 15/846,390

(22) Filed: Dec. 19, 2017

(65) Prior Publication Data

US 2018/0277825 A1 Sep. 27, 2018

(30) Foreign Application Priority Data

Mar. 24, 2017 (JP) ................................. 2017-058470

(51) Int. Cl.
| | |
|---|---|
| *H01M 4/04* | (2006.01) |
| *H01M 4/62* | (2006.01) |
| *H01M 10/058* | (2010.01) |
| *H01M 4/485* | (2010.01) |
| *H01M 4/66* | (2006.01) |
| *H01M 4/139* | (2010.01) |
| *H01M 10/0525* | (2010.01) |
| *H01M 4/02* | (2006.01) |
| *H01M 4/1391* | (2010.01) |

(52) U.S. Cl.
CPC ......... *H01M 4/0416* (2013.01); *H01M 4/043* (2013.01); *H01M 4/0404* (2013.01); *H01M 4/139* (2013.01); *H01M 4/485* (2013.01); *H01M 4/623* (2013.01); *H01M 4/625* (2013.01); *H01M 4/667* (2013.01); *H01M 10/058* (2013.01); *H01M 4/1391* (2013.01); *H01M 10/0525* (2013.01); *H01M 2004/028* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 2013/0071722 | A1* | 3/2013 | Yuasa | H01M 4/64 429/158 |
| 2016/0190566 | A1* | 6/2016 | Shiozaki | H01M 4/366 429/231.1 |
| 2018/0277848 | A1* | 9/2018 | Matsumura | C08L 15/00 |

FOREIGN PATENT DOCUMENTS

| | | | |
|---|---|---|---|
| JP | 2011-233564 | * | 11/2011 |
| JP | 2011-233564 A | | 11/2011 |
| JP | 5153056 B2 | | 2/2013 |

* cited by examiner

*Primary Examiner* — Alix E Eggerding
(74) *Attorney, Agent, or Firm* — Westerman, Hattori, Daniels & Adrian, LLP

(57) ABSTRACT

A method for manufacturing an electrode plate includes a first application step of applying conductive layer slurry containing fibrous carbon to a surface of a core made of metal foil, a second application step of applying active material mix layer slurry containing an active material to the conductive layer slurry before the conductive layer slurry dries, and a drying step of drying the conductive layer slurry and the active material mix layer slurry. The fibrous carbon contained in the conductive layer slurry has a fiber length-to-diameter ratio of 20:1 to 2,000:1. The amount of the fibrous carbon, contained in the conductive layer slurry applied to the core surface, per unit are of the core is 0.05 g/m² to 0.20 g/m² after the first application step.

7 Claims, 3 Drawing Sheets

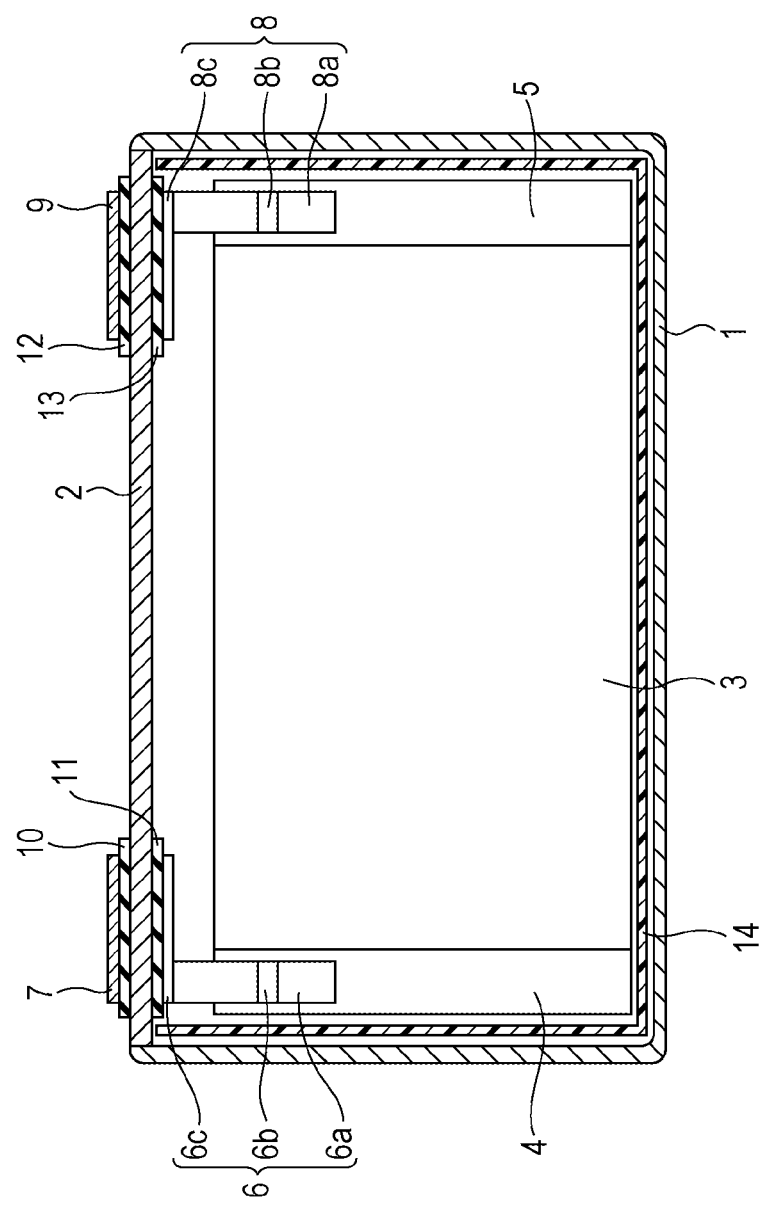
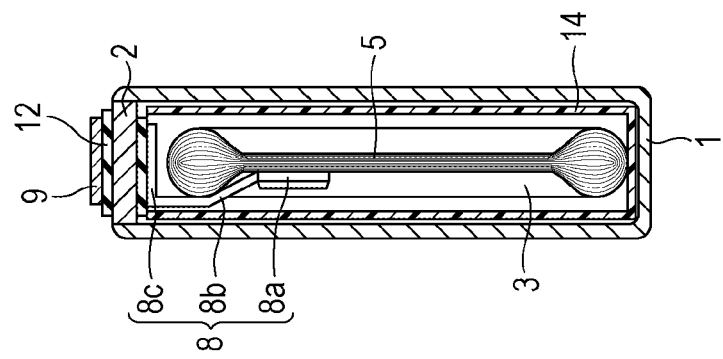

METHOD FOR MANUFACTURING ELECTRODE PLATE AND METHOD FOR MANUFACTURING SECONDARY BATTERY

CROSS REFERENCE TO RELATED APPLICATIONS

The present invention application claims priority to Japanese Patent Application No. 2017-058470 filed in the Japan Patent Office on Mar. 24, 2017, the entire contents of which are incorporated herein by reference.

BACKGROUND OF THE INVENTION

Field of the Invention

The present invention relates to a method for manufacturing an electrode plate and a method for manufacturing a secondary battery.

Description of Related Art

Secondary batteries such as nonaqueous electrolyte secondary batteries are being used in power supplies for driving electric vehicles (EVs), hybrid electric vehicles (HEVs, PHEVs), and the like. The secondary batteries are required to have high power characteristics.

In usual, a secondary battery includes an electrode plate including a core made of metal foil and an active material mix layer, placed on a surface of the core, containing an active material. In order to obtain a secondary battery with more excellent power characteristics, an electrode plate with lower resistance is preferably used.

As a method for reducing the resistance of an electrode plate, the following technique has been proposed: a technique in which a conductive layer is provided on a surface of a core made of metal foil and an active material mix layer containing an active material is formed on the conductive layer.

For example, Japanese Patent No. 5153056 (Patent Document 1) discloses a technique for providing carbon nanofibers on a surface of a current collector.

The contact resistance between a core and an active material mix layer can be reduced by forming a conductive layer between the core and the active material mix layer, thereby enabling an electrode plate with low resistance to be prepared. However, the electrode plate is required to have further reduced resistance.

BRIEF SUMMARY OF THE INVENTION

It is an object of the present invention to provide an electrode plate with lower resistance.

A method for manufacturing an electrode plate according to an aspect of the present invention includes a first application step of applying conductive layer slurry containing fibrous carbon to a surface of a core made of metal foil, a second application step of applying active material mix layer slurry containing an active material to the conductive layer slurry before the conductive layer slurry dries, and a drying step of drying the conductive layer slurry and the active material mix layer slurry. The fibrous carbon contained in the conductive layer slurry has a fiber length-to-diameter ratio of 20:1 to 2,000:1. The amount of the fibrous carbon, contained in the conductive layer slurry applied to the core surface, per unit are of the core is 0.05 g/m$^2$ to 0.20 g/m$^2$ after the first application step.

In the above method, the active material mix layer slurry is applied to the conductive layer slurry before the conductive layer slurry dries and the shape and content of the fibrous carbon, which serves as a conductive material, contained in the conductive layer slurry are limited. According to the above method, the contact resistance between the core and an active material mix layer can be effectively reduced.

Interdiffusion occurs at the interface between a layer of the conductive layer slurry and a layer of the positive electrode active material mix layer slurry, that is, the fibrous carbon contained in the conductive layer slurry diffuses into the active material mix layer slurry and the active material contained in the active material mix layer slurry diffuses into the conductive layer slurry. In this state, the fibrous carbon, which is a conductive material, diffusing from the conductive layer slurry and the active material diffusing from the active material mix layer slurry form a diffusion layer in which the fibrous carbon and the positive electrode active material are present so as to be intertwined with each other. The diffusion layer has a certain thickness and is in contact with a conductive layer and the active material mix layer. Therefore, in the diffusion layer, the fibrous carbon, which is contained in the conductive layer slurry, and the diffusing active material, which is contained in the active material mix layer slurry, have a contact area larger than that obtained in the case where the conductive layer is formed in advance and the active material mix layer slurry is applied to the dried conductive layer; hence, the contact resistance can be reduced.

The diffusion layer preferably has a thickness of 0.5 μm to 2 μm and more preferably 0.5 μm to 1.5 μm.

The thickness of the applied conductive layer slurry is preferably less than the thickness of the applied active material mix layer slurry. In this case, the thickness of the applied conductive layer slurry is small. Therefore, in the case of drying the conductive layer slurry only, the conductive layer slurry, which uniformly extends over the core, moves during drying and therefore a portion not covered by the conductive layer may possibly be caused. However, in the above method, the active material mix layer slurry is applied to the conductive layer slurry before the conductive layer slurry is dried; hence, the occurrence of defects in the conductive layer can be effectively suppressed.

In the first application step, the thickness of the conductive layer slurry applied to the core surface is 0.02 μm to 1 μm.

It is preferable that the conductive layer slurry contains a binding agent and a dispersion medium and the mass ratio of the binding agent to the fibrous carbon is 0.5:100 to 3:100.

It is preferable that the electrode plate is a positive plate and the binding agent is polyvinylidene fluoride.

The method preferably further includes a third application step of applying protective layer slurry to a portion of the core that is close to a region coated with the active material mix layer slurry. It is preferable that the protective layer slurry is dried in the drying step, the protective layer slurry contains inorganic particles and a binding agent, and the protective layer slurry does not contain the active material or has an active material content less than the content of the active material in the active material mix layer slurry.

In a secondary battery, the area of a formed negative electrode active material mix layer is preferably larger than the area of a formed positive electrode active material mix layer. In such a configuration, a separator located between the negative electrode active material mix layer and a portion of a positive electrode core that is close to the positive electrode active material mix layer may possibly be damaged, thereby causing a short circuit between a positive electrode and a negative electrode. Therefore, the portion of the positive electrode core that is close to the positive electrode active material mix layer is provided with a protective layer which has an electrical conductivity lower than that of the positive electrode active material mix layer or which is insulating. The protective layer contains no active material. Even if an active material is contained in the protective layer, the amount of the active material contained in the protective layer is less than the amount of the active material contained in an active material mix layer.

At least one portion of the protective layer slurry is preferably directly applied to the core.

A secondary battery can be manufactured using an electrode plate manufactured by the method. In this case, an electrode assembly is prepared using the electrode plate, another electrode plate different in polarity from the electrode plate, and a separator and the electrode assembly is provided in a battery case.

According to the present invention, an electrode plate with lower resistance can be provided and a secondary battery with more excellent power characteristics can also be provided.

BRIEF DESCRIPTION OF THE SEVERAL VIEWS OF THE DRAWINGS

FIG. 3A is a sectional view taken along the line IIIA-IIIA of FIG. 2.

FIG. 3B is a sectional view taken along the line IIIB-IIIB of FIG. 2.

DETAILED DESCRIPTION OF THE INVENTION

Figure 1:
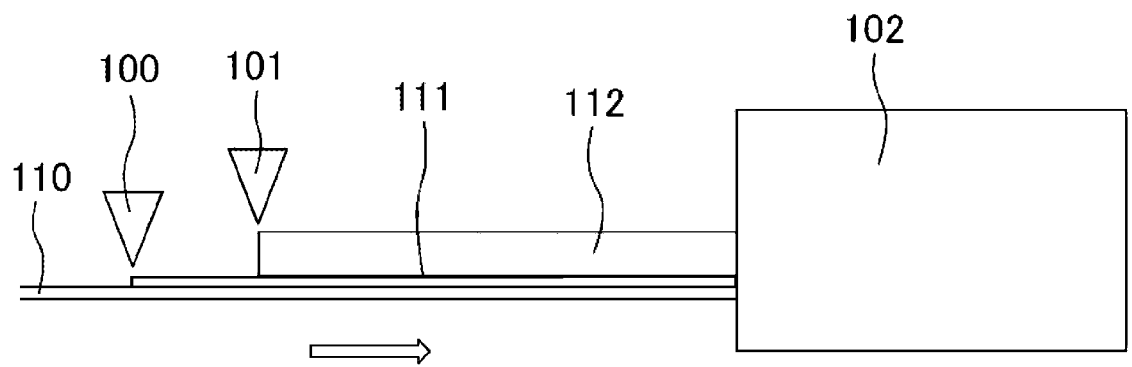
FIG. 1 is an illustration showing a step of applying conductive layer slurry and positive electrode active material mix layer slurry to a positive electrode core, followed by drying the conductive layer slurry and the positive electrode active material mix layer slurry.

A method for manufacturing an electrode plate according to an embodiment of the present invention is described using a method for manufacturing a positive plate for nonaqueous electrolyte secondary batteries as an example. The present invention is not limited to embodiments below.

Preparation of Conductive Layer Slurry

Fibrous carbon, a binding agent, and a dispersion medium are mixed together, whereby conductive layer slurry 111 is prepared. The fibrous carbon used has a fiber length-to-diameter ratio of 20:1 to 2,000:1. The fibrous carbon preferably has fiber diameter of 1 nm to 1,000 nm, more preferably 5 nm to 800 nm, and further more preferably 10 nm to 500 nm.

The mass ratio of the binding agent contained in the conductive layer slurry 111 to the fibrous carbon contained in the conductive layer slurry 111 is preferably 0.1:100 to 5:100 and more preferably 0.5:100 to 3:100.

The binding agent used is preferably a fluorinated resin such as polyvinylidene fluoride (PVdf) or polytetrafluoroethylene, an acrylic polymer, a vinyl polymer, or the like.

The dispersion medium used is preferably an aprotic polar compound such as N-methyl-2-pyrrolidone or γ-butyrolactone.

Preparation of Positive Electrode Active Material Mix Layer Slurry

A positive electrode active material, a conductive material, a binding agent, and a dispersion medium are mixed together, whereby positive electrode active material mix layer slurry 112 is prepared.

The positive electrode active material used may be a lithium-transition metal composite oxide or the like.

The conductive material used may be electronically conductive carbon including natural or synthetic crystalline graphite; carbon black including thermal black, channel black, and furnace black; and glassy carbon.

The binding agent used may be a fluorinated resin such as polyvinylidene fluoride (PVdf) or polytetrafluoroethylene, an acrylic polymer, a vinyl polymer, or the like.

The dispersion medium used is preferably an aprotic polar compound such as N-methyl-2-pyrrolidone or γ-butyrolactone.

The mass ratio of the conductive material contained in the positive electrode active material mix layer slurry 112 to the positive electrode active material contained in the positive electrode active material mix layer slurry 112 is preferably 0.5:100 to 7:100 and more preferably 1:100 to 5:100.

Application and Drying

FIG. 1 is an illustration showing a step of applying the conductive layer slurry 111 and the positive electrode active material mix layer slurry 112 to a surface of a positive electrode core 110 and drying the conductive layer slurry 111 and the positive electrode active material mix layer slurry 112.

The positive electrode core 110 is strip-shaped. Referring to FIG. 1, the positive electrode core 110 is moved rightward. In a first application section 100, the conductive layer slurry 111 is applied to a surface of the positive electrode core 110. In a second application section 101, the positive electrode active material mix layer slurry 112 is applied to the conductive layer slurry 111 applied to the positive electrode core 110. Incidentally, before the conductive layer slurry 111 dries, the positive electrode active material mix layer slurry 112 is applied to the conductive layer slurry 111. Thereafter, the positive electrode core 110 coated with the conductive layer slurry 111 and the positive electrode active material mix layer slurry 112 passes through a drying oven 102, whereby the dispersion medium contained in the conductive layer slurry 111 and the dispersion medium contained in the positive electrode active material mix layer slurry 112 are removed. This dries the conductive layer slurry 111 and the positive electrode active material mix layer slurry 112, whereby a conductive layer and a positive electrode active material mix layer are formed.

Referring to FIG. 1, the conductive layer and the positive electrode active material mix layer are formed on a single surface of the positive electrode core 110. Conductive layers and positive electrode active material mix layers may be formed on both surfaces of the positive electrode core 110. In this case, after the conductive layer and the positive electrode active material mix layer are formed on the single surface of the positive electrode core 110, the conductive layer slurry 111 and the positive electrode active material mix layer slurry 112 may be applied to an uncoated surface of the positive electrode core 110 in the same step, followed by drying.

The thickness of the conductive layer slurry 111 applied to the positive electrode core 110 is preferably 0.01 µm to 2 µm and more preferably 0.02 µm to 1 µm.

The thickness of the positive electrode active material mix layer slurry 112 applied to the conductive layer slurry 111 is preferably 75 µm to 150 µm and more preferably 75 µm to 125 µm.

An application process used in first application section 100 and the second application section 101 is not particularly limited and is preferably, for example, a die coating process or a gravure coating process.

The positive electrode core 110 is preferably made of metal foil. The metal foil is preferably, for example, aluminium foil or aluminium alloy foil. The positive electrode core 110 preferably has a thickness of 5 µm to 50 µm, more preferably 5 µm to 30 µm, and further more preferably 10 µm to 20 µm.

Compression

The positive electrode core 110 provided with the conductive layer and the positive electrode active material mix layer is compressed, whereby the positive plate is obtained. In the compression of the positive electrode core 110, the positive electrode active material mix layer is compressed so as to have a predetermined thickness and a predetermined packing density. For example, a pair of compression rollers can be used to compress the positive electrode core 110.

The compressed conductive layer preferably has a thickness of 0.01 µm to 2 µm, more preferably 0.01 µm to 1 µm, and further more preferably 0.01 µm to 0.8 µm. The compressed positive electrode active material mix layer preferably has a thickness of 30 µm to 120 µm, more preferably 40 µm to 110 µm, and further more preferably 50 µm to 100 µm. These thicknesses are the thicknesses of the conductive layer and positive electrode active material mix layer formed on a surface of the positive electrode core 110.

Cutting

The positive plate is cut to a predetermined size. An end section of the cut positive plate is provided with a positive electrode core-exposed portion in which a surface of the positive electrode core 110 is not covered by the conductive layer or the positive electrode active material mix layer and in which the positive electrode core 110 is exposed. A positive electrode current collector is connected to the positive electrode core-exposed portion.

EXAMPLES

Example 1

A method for manufacturing a positive plate according to Example 1 and a method for manufacturing a prismatic secondary battery according to Example 1 are described below.

Preparation of Positive Plate

Preparation of Conductive Layer Slurry

Fibrous carbon having a fiber diameter of 10 nm and a fiber length of 20 µm, polyvinylidene fluoride serving as a binding agent, and N-methyl-2-pyrrolidone serving as a dispersion medium were mixed together such that the mass ratio of fibrous carbon to polyvinylidene fluoride was 10:2. The mixture was stirred at a rotational speed of 3,000 rpm for 10 minutes using a disperser type of agitator, whereby conductive layer slurry was obtained.

Preparation of Positive Electrode Active Material Mix Layer

A lithium-nickel-cobalt-manganese composite oxide ($LiNi_{0.35}Co_{0.35}Mn_{0.30}O_2$) serving as a positive electrode active material, polyvinylidene fluoride serving as a binding agent, carbon black serving as a conductive material, and N-methyl-2-pyrrolidone serving as a dispersion medium were kneaded such that the mass ratio of the lithium-nickel-manganese-cobalt composite oxide to polyvinylidene fluoride to carbon black was 97.1:0.9:2.0, whereby positive electrode active material mix layer slurry was prepared.

Application

The conductive layer slurry prepared by the above method was applied to a surface of a positive electrode core, made of aluminium foil, having a thickness of 15 jim. Thereafter, before the conductive layer slurry dried, the positive electrode active material mix layer slurry was applied to the conductive layer slurry. The thickness of the conductive layer slurry on the positive electrode core was 4 µm. The thickness of the positive electrode active material mix layer slurry on the conductive layer slurry was 300 µm. The amount of the fibrous carbon, contained in the conductive layer slurry applied to the positive electrode core surface, per unit are of the positive electrode core was 0.2 $g/m^2$.

Drying

The conductive layer slurry and the positive electrode active material mix layer slurry were dried at 110° C. for 5 minutes, whereby a conductive layer and a positive electrode active material mix layer were formed on the positive electrode core.

Compression

The conductive layer and the positive electrode active material mix layer on the positive electrode core were compressed with a pair of compression rollers such that the positive electrode active material mix layer had a thickness of 140 µm, whereby a positive plate according to Example 1 was prepared. The positive plate according to Example 1 included an end section provided with a positive electrode core-exposed portion.

Preparation of Negative Plate

Graphite (an average particle size of 15 µm) serving as a negative electrode active material, styrene-butadiene rubber (SBR) serving as a binding agent, carboxymethylcellulose (CMC) serving as a thickening agent, and water were kneaded such that the mass ratio of graphite to SBR to CMC was 98.3:1:0.7, whereby negative electrode active material mix layer slurry was prepared.

The negative electrode active material mix layer slurry was applied to both surfaces of a negative core, made of copper foil, having a thickness of 10 µm using a die coater. Thereafter, water in the negative electrode active material mix layer slurry was removed by drying the negative electrode active material mix layer slurry, whereby negative electrode active material mix layers were formed. The negative electrode active material mix layers were compressed with a compression roller so as to have a predetermined packing density, whereby a negative plate was prepared. The negative plate included an end section provided with a negative electrode core-exposed portion.

Preparation of Electrode Assembly

The positive plate according to Example 1 was cut such that the positive electrode core included a 484 cm×11.7 cm region covered by the positive electrode active material mix layer. The negative plate was cut such that the negative electrode core included a 500 cm×12.2 cm region covered by each of the negative electrode active material mix layers. The positive plate according to Example 1 and the negative plate were wound with a separator therebetween, the separator having a thickness of 18 µm and including a porous membrane made of polypropylene, and were press-molded into a flat electrode assembly. A positive electrode current collector was connected to the positive electrode core-exposed portion of the positive plate according to Example 1. A negative electrode current collector was connected to the negative electrode core-exposed portion of the negative plate.

Preparation of Nonaqueous Electrolyte Solution

Ethylene carbonate (EC), ethyl methyl carbonate (EMC), and diethyl carbonate (DEC) were mixed at a volume ratio of 25:35:40 at 25° C. and 1 atmosphere, whereby a solvent mixture was prepared. To the solvent mixture, $LiPF_6$ was added such that the concentration of $LiPF_6$ in the solvent mixture was 1 mol/L. Furthermore, vinylene carbonate (VC) was added to the solvent mixture, whereby a nonaqueous electrolyte solution was prepared. The content of VC in the nonaqueous electrolyte solution was 0.3% by mass.

Assembly of Battery

The electrode assembly, which was provided with the positive and negative electrode current collectors and which was prepared by the above method, and the nonaqueous electrolyte solution were provided in a rectangular enclosure, followed by sealing the rectangular enclosure with a sealing plate, whereby a prismatic secondary battery according to Example 1 was prepared.

Comparative Example 1

A positive plate and prismatic secondary battery according to Comparative Example 1 were prepared by substantially the same method as that used in Example 1 except that no conductive layer slurry was applied to a positive electrode core and positive electrode active material mix layer slurry was directly applied to the positive electrode core.

Comparative Example 2

A positive plate and prismatic secondary battery according to Comparative Example 2 were prepared by substantially the same method as that used in Example 1 except that after conductive layer slurry was applied to a positive electrode core and was dried in a crying oven, positive electrode active material mix layer slurry was applied to the dried conductive layer slurry.

Comparative Example 3

A positive plate and prismatic secondary battery according to Comparative Example 3 were prepared by substantially the same method as that used in Example 1 except that spherical graphite with an average particle size of 300 nm was used to prepare conductive layer slurry instead of fibrous carbon.

Comparative Example 4

A positive plate and prismatic secondary battery according to Comparative Example 4 were prepared by substantially the same method as that used in Example 1 except that the amount of fibrous carbon, contained in conductive layer slurry applied to a surface of a positive electrode core, per unit are of the positive electrode core was 0.01 g/m².

Example 2

A positive plate and prismatic secondary battery according to Example 2 were prepared by substantially the same method as that used in Example 1 except that the amount of fibrous carbon, contained in conductive layer slurry applied to a surface of a positive electrode core, per unit are of the positive electrode core was 0.05 g/m².

Example 3

A positive plate and prismatic secondary battery according to Example 3 were prepared by substantially the same method as that used in Example 1 except that the amount of fibrous carbon, contained in conductive layer slurry applied to a surface of a positive electrode core, per unit are of the positive electrode core was 0.10 g/m².

Comparative Example 5

A positive plate and prismatic secondary battery according to Comparative Example 5 were prepared by substantially the same method as that used in Example 1 except that the amount of fibrous carbon, contained in conductive layer slurry applied to a surface of a positive electrode core, per unit are of the positive electrode core was 0.40 g/m².

Comparative Example 6

A positive plate and prismatic secondary battery according to Comparative Example 6 were prepared by substantially the same method as that used in Example 1 except that fibrous carbon contained in conductive layer slurry had a fiber diameter of 10 nm and a fiber length of 50 μm.

Example 4

A positive plate and prismatic secondary battery according to Example 4 were prepared by substantially the same method as that used in Example 1 except that fibrous carbon contained in conductive layer slurry had a fiber diameter of 150 nm and a fiber length of 9 μm.

Example 5

A positive plate and prismatic secondary battery according to Example 5 were prepared by substantially the same method as that used in Example 1 except that fibrous carbon contained in conductive layer slurry had a fiber diameter of 500 nm and a fiber length of 10 μm.

Comparative Example 7

A positive plate and prismatic secondary battery according to Comparative Example 7 were prepared by substantially the same method as that used in Example 1 except that fibrous carbon contained in conductive layer slurry had a fiber diameter of 500 nm and a fiber length of 2.5 μm.

Evaluation of Surface Resistivity of Positive Plates

The positive plate according to each of Examples 1 to 5 and Comparative Examples 1 to 7 was cut to a size of 3 cm×4 cm. The surface resistivity of the positive plate was measured at 25° C. by a four-terminal technique using Loresta GP available from Mitsubishi Chemical Analytech Co. Ltd.

Evaluation of Adhesion Property

The positive plate according to each of Examples 1 to 5 and Comparative Examples 1 to 7 was cut into a specimen with a size of 25 cm×150 cm. Next, a plastic plate was attached to a coated surface of the specimen using a double-sided tape, NW-20, available from Nichiban Co., Ltd. Force was applied perpendicularly to the specimen, followed by peeling off the specimen at an angle of 90° (a peeling width of 20 mm, a peeling rate of 50 mm/min). The force (newton (N)) applied perpendicularly to the specimen when the specimen was peeled off was read. A measurement instrument used was Autograph available from Shimadzu Corporation.

The condition of the specimen taken from the positive plate according to each of Examples 1 to 5 and Comparative Examples 1 to 7 was visually checked after peeling. Results were as described below.

In the specimen taken from the positive plate according to Comparative Example 1, peeling occurred at the interface between the positive electrode core and the positive electrode active material mix layer.

In the specimen taken from the positive plate according to Example 1, peeling occurred in the positive electrode active material mix layer.

In the specimen taken from the positive plate according to each of Comparative Examples 2 and 3, peeling occurred at the interface between the conductive layer and the positive electrode active material mix layer.

From the above, it is clear that, in the whole of the positive plate according to Comparative Example 1, the interface between the positive electrode core and the positive electrode active material mix layer is a portion having the lowest adhesion property and, in the positive plate according to each of Comparative Examples 2 and 3, the interface between the conductive layer and the positive electrode active material mix layer is a portion having the lowest adhesion property.

However, in the positive plate according to Example 1, peeling occurred in the positive electrode active material mix layer and therefore it is clear that the conductive layer and the positive electrode active material mix layer are more tightly bonded to each other as compared to those of the positive plate according to each of Comparative Examples 2 and 3.

Evaluation of Power Characteristic

The prismatic secondary batteries according to Examples 1 to 5 and Comparative Examples 1 to 7 were tested as described below, whereby the power characteristic thereof was determined.

That is, the charged capacity of each prismatic secondary battery was adjusted to a state of charge (SOC) of 50%, CC discharge (40 A for 10 seconds) was performed, and the voltage was determined after 10 seconds. After an interval of 5 minutes, the discharged capacity (20 seconds in the case of 40 A discharge) was charged by CC charge (20 A), whereby the charged capacity of the prismatic secondary battery was returned to a SOC of 50%. This operation was repeated, CC discharge was performed at 40 A, 80 A, 120 A, 160 A, 200 A, and 240 A; and the voltage was determined after 10 seconds. Thereafter, the CC discharge current was plotted on the horizontal axis, the voltage after 10 seconds was plotted on the vertical axis, and obtained dots were connected, whereby a straight line was obtained. The straight line was approximated and the value of the CC discharge current at a voltage of 3.0 V was assigned to a power characteristic.

Results obtained by evaluating the surface resistivity, adhesion property, and power characteristic of the prismatic secondary batteries according to Examples 1 to 5 and Comparative Examples 1 to 7 are shown in Tables 1 to 3. The results shown in Tables 1 to 3 are expressed as relative values on the basis that each of the results of Comparative Example 1 is 100.

TABLE 1

| | Conductive layer | Conductive Material | Application of positive electrode active material mix layer slurry | Fiber diameter of fibrous carbon (nm) | Fiber length of fibrous carbon (μm) | Fiber length-to-diameter ratio | Amount of fibrous carbon (g/m$^2$) | Surface resistivity | Adhesion property | Power characteristic |
|---|---|---|---|---|---|---|---|---|---|---|
| Example 1 | Formed | Fibrous carbon | Before drying conductive layer slurry | 10 | 20 | 2,000:1 | 0.20 | 77 | 200 | 120 |
| Comparative Example 1 | Not formed | — | — | — | — | — | — | 100 | 100 | 100 |
| Comparative Example 2 | Formed | Fibrous carbon | After drying conductive layer slurry | 10 | 20 | 2,000:1 | 0.20 | 100 | 105 | 103 |
| Comparative Example 3 | Formed | Spherical graphite | Before drying conductive layer slurry | — | — | — | — | 95 | 105 | 103 |

As shown in Table 1, Example 1, in which the conductive layer slurry contained fibrous carbon and the positive electrode active material mix layer slurry was applied to the conductive layer slurry before the conductive layer slurry dried, exhibited significantly improved surface resistivity, adhesion property, and power characteristic as compared to Comparative Example 1, in which no conductive layer was present. This is probably because interdiffusion occurred at the interface between the conductive layer slurry and the positive electrode active material mix layer slurry, a diffusion layer contained the fibrous carbon contained in the conductive layer slurry and a positive electrode active material, the fibrous carbon and the positive electrode active material were present in the diffusion layer so as to be intertwined with each other, and therefore the conductive layer and the positive electrode active material mix layer had a large contact area and were in contact with each other in a preferable state.

In order to promote interdiffusion at the interface between the conductive layer slurry and the positive electrode active material mix layer slurry, a dispersion medium and binding agent used to prepare the conductive layer slurry are preferably the same as a dispersion medium and binding agent used to prepare the positive electrode active material mix layer slurry.

Comparative Example 2, in which the positive electrode active material mix layer slurry was applied to the conductive layer after the conductive layer slurry applied to the positive electrode core was dried in the drying oven, exhibited slightly improved surface resistivity, adhesion property, and power characteristic. This is probably because, in Comparative Example 2, since the positive electrode active material mix layer slurry was applied to the conductive layer dried in advance, the positive electrode active material mix layer slurry did not sufficiently penetrate into the conductive layer dried in advance, no diffusion layer was formed, the contact area between the conductive layer and the positive electrode active material mix layer was not large, and the adhesion between the conductive layer and the positive electrode active material mix layer did not increase, resulting in insufficient improvements in surface resistivity, power characteristic, and power characteristic.

Comparative Example 3, in which no fibrous carbon was contained in the conductive layer, even though the positive electrode active material mix layer slurry was applied to the conductive layer slurry before the conductive layer slurry dried, exhibited slightly improved surface resistivity, adhesion property, and power characteristic. This is probably because, in the case of fibrous carbon, a diffusion layer was formed such that the fibrous carbon and a positive electrode active material were present in the diffusion layer so as to be intertwined with each other and however, in the case of spherical graphite, the spherical graphite was unlikely to be intertwined with the positive electrode active material and the number of contacts between the spherical graphite and the positive electrode active material was small, resulting in insufficient improvements in surface resistivity, power characteristic, and power characteristic.

between Examples 1 to 3 and Comparative Examples 4 and 5. As shown in Table 2, in Examples 1 to 3, in which the amount of fibrous carbon per unit area is 0.05 g/m$^2$ to 0.20 g/m$^2$, the positive plates have low surface resistivity and high adhesion property. Using such a positive plate provides a prismatic secondary battery with excellent power characteristics.

When the amount of fibrous carbon, contained in conductive layer slurry, per unit area is less than 0.05 g/m$^2$, it is conceivable that the absolute amount of a conductive material in a conductive layer is too small, the contact resistance between a positive electrode core and a positive electrode active material mix layer cannot be sufficiently reduced, and the adhesion therebetween cannot be increased. Since fibrous carbon is bulky, a conductive layer containing the fibrous carbon has low density. Therefore, when the amount of the fibrous carbon is more than 0.20 g/m$^2$, the conductive layer containing the fibrous carbon has low strength and reduced adhesion property. Therefore, it is conceivable that the contact resistance between the positive electrode core and the positive electrode active material mix layer cannot be sufficiently reduced and the adhesion therebetween cannot be increased. Thus, the amount of fibrous

TABLE 2

|  | Conductive layer | Conductive Material | Application of positive electrode active material mix layer slurry | Fiber diameter of fibrous carbon (nm) | Fiber length of fibrous carbon (μm) | Fiber length-to-diameter ratio | Amount of fibrous carbon (g/m$^2$) | Surface resistivity | Adhesion property | Power characteristic |
| --- | --- | --- | --- | --- | --- | --- | --- | --- | --- | --- |
| Comparative Example 4 | Formed | Fibrous carbon | Before drying conductive layer slurry | 10 | 20 | 2000:1 | 0.01 | 97 | 102 | 100 |
| Example 2 | Formed | Fibrous carbon | Before drying conductive layer slurry | 10 | 20 | 2000:1 | 0.05 | 81 | 152 | 113 |
| Example 3 | Formed | Fibrous carbon | Before drying conductive layer slurry | 10 | 20 | 2000:1 | 0.10 | 75 | 220 | 120 |
| Example 1 | Formed | Fibrous carbon | After drying conductive layer slurry | 10 | 20 | 2000:1 | 0.20 | 77 | 200 | 120 |
| Comparative Example 5 | Formed | Fibrous carbon | Before drying conductive layer slurry | 10 | 20 | 2000:1 | 0.40 | 98 | 101 | 100 |

As shown in Table 2, the amount of fibrous carbon, contained in conductive layer slurry, per unit area differs carbon per unit area of the positive electrode core is preferably 0.05 μm$^2$ to 0.20 g/m$^2$.

TABLE 3

|  | Conductive layer | Conductive material | Application of positive electrode active material mix layer slurry | Fiber diameter of fibrous carbon (nm) | Fiber length of fibrous carbon (μm) | Fiber length-to-diameter ratio | Amount of fibrous carbon (g/m$^2$) | Surface resistivity | Adhesion property | Power characteristic |
| --- | --- | --- | --- | --- | --- | --- | --- | --- | --- | --- |
| Comparative Example 6 | Formed | Fibrous carbon | Before drying conductive layer slurry | 10 | 50 | 5000:1 | 0.20 | 100 | 105 | 103 |
| Example 1 | Formed | Fibrous carbon | Before drying conductive layer slurry | 10 | 20 | 2000:1 | 0.20 | 77 | 200 | 120 |
| Example 4 | Formed | Fibrous carbon | Before drying conductive layer slurry | 150 | 9 | 60:1 | 0.20 | 76 | 210 | 118 |

TABLE 3-continued

|  | Conductive layer | Conductive material | Application of positive electrode active material mix layer slurry | Fiber diameter of fibrous carbon (nm) | Fiber length of fibrous carbon (μm) | Fiber length-to-diameter ratio | Amount of fibrous carbon (g/m²) | Surface resistivity | Adhesion property | Power characteristic |
|---|---|---|---|---|---|---|---|---|---|---|
| Example 5 | Formed | Fibrous carbon | After drying conductive layer slurry | 500 | 10 | 20:1 | 0.20 | 78 | 205 | 117 |
| Comparative Example 7 | Formed | Fibrous carbon | Before drying conductive layer slurry | 500 | 2.5 | 5:1 | 0.20 | 98 | 101 | 100 |

As shown in Table 3, the fiber diameter and length of fibrous carbon differs between Examples 1, 4, and 5 and Comparative Examples 6 and 7. As shown in Table 3, Examples 1, 4, and 5, in which the fiber length-to-diameter ratio of fibrous carbon is 20:1 to 2,000:1, the positive plates have low surface resistivity and high adhesion property. Using such a positive plate provides a prismatic secondary battery with excellent power characteristics.

When the fiber length-to-diameter ratio of fibrous carbon is less than 20:1, it is conceivable that the contact between a conductive layer containing the fibrous carbon and a positive electrode active material mix layer is insufficient, the contact resistance between a positive electrode core and the positive electrode active material mix layer cannot be sufficiently reduced, and the adhesion therebetween cannot be increased. When the fiber length-to-diameter ratio of fibrous carbon is greater than 2,000:1, it is conceivable that cavities are likely to be caused in the conductive layer, the contact resistance between the positive electrode core and the positive electrode active material mix layer cannot be sufficiently reduced, and the adhesion therebetween cannot be increased. Thus, the fiber length-to-diameter ratio of fibrous carbon is preferably 20:1 to 2,000:1.

Figure 2:
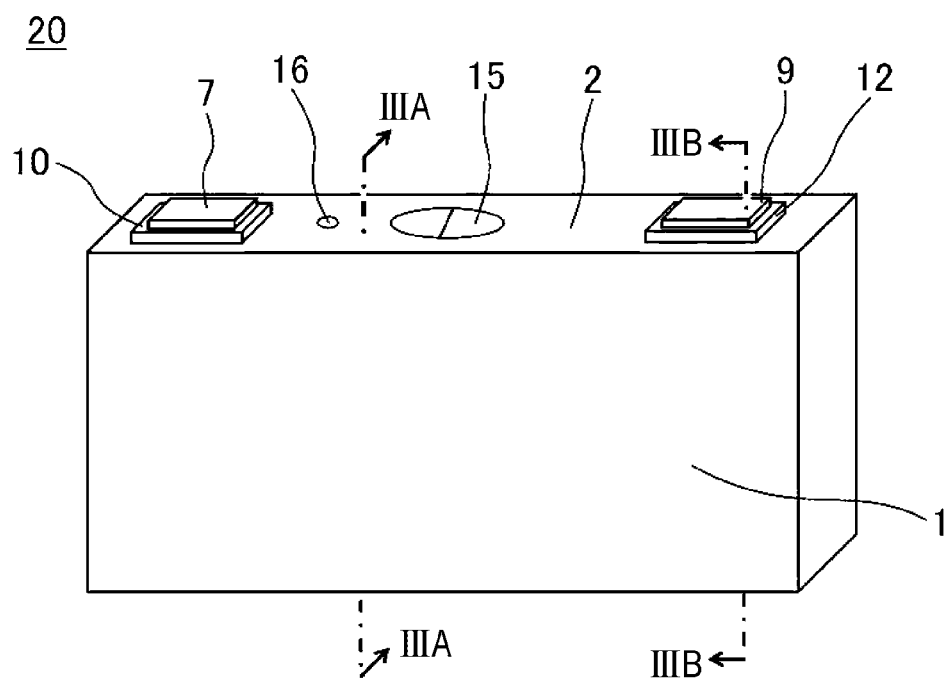
FIG. 2 is a perspective view of a prismatic secondary battery.
Figure 4:
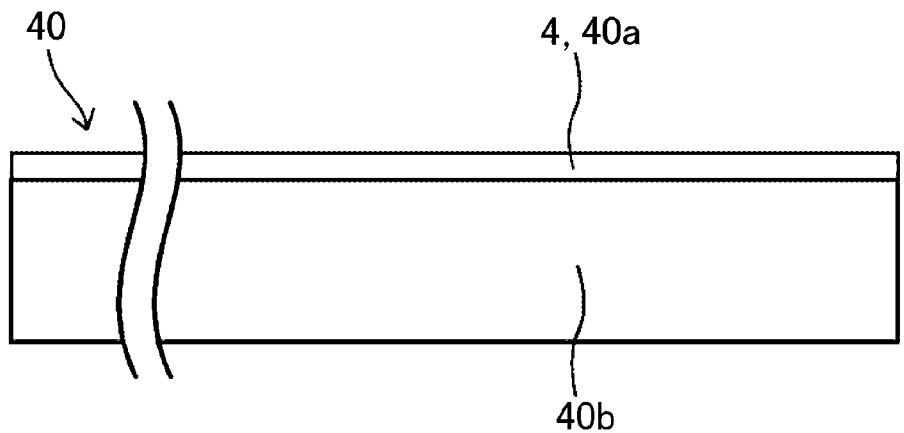
FIG. 4 is a plan view of a positive plate.
Figure 5:
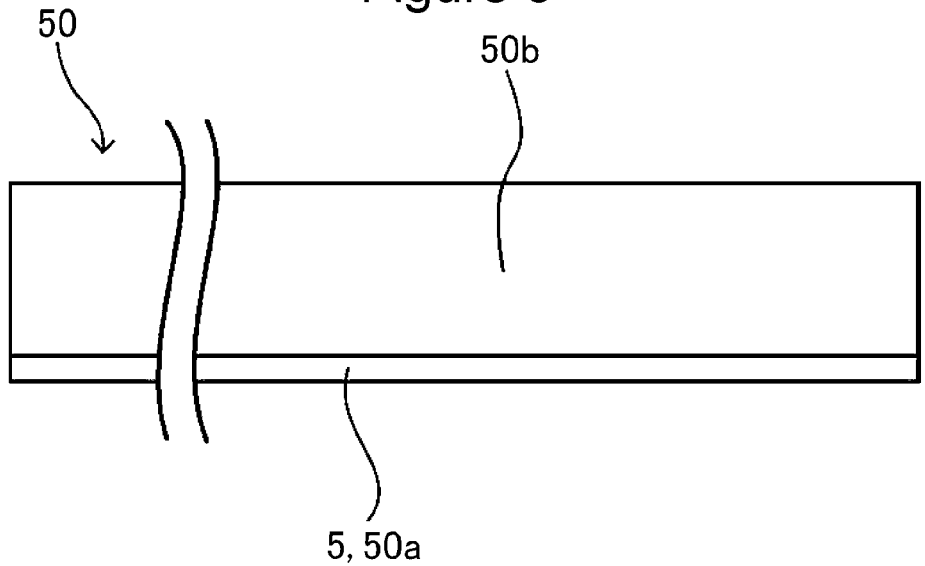
FIG. 5 is a plan view of a negative plate.

The configuration of a prismatic secondary battery 20 including a positive plate 40 manufactured by the above method and a method for manufacturing the prismatic secondary battery 20 are described below. FIG. 2 is a perspective view of the prismatic secondary battery 20. FIG. 3A is a sectional view taken along the line IIIA-IIIA of FIG. 2. FIG. 3B is a sectional view taken along the line IIIB-IIIB of FIG. 2. FIG. 4 is a plan view of the positive plate 40. FIG. 5 is a plan view of a negative plate 50.

Positive Plate

The positive plate 40 is cut as shown in FIG. 4. As shown in FIG. 4, the positive plate 40 includes an elongated positive electrode core 40a and also includes a conductive layer (not shown) and positive electrode active material mix layer 40b formed on a surface of the positive electrode core 40a in that order. A lateral end section of the positive plate 40 is provided with a positive electrode core-exposed portion 4 extending in a longitudinal direction.

Negative Plate

The negative plate 50 manufactured by the above method is cut as shown in FIG. 5. As shown in FIG. 5, the negative plate 50 includes an elongated negative electrode core 50a and a negative electrode active material mix layer 50b formed on a surface of the negative electrode core 50a. A lateral end section of the negative plate 50 is provided with a negative electrode core-exposed portion 5 extending in a longitudinal direction.

Preparation of Wound Electrode Assembly

The positive plate 40 and the negative plate 50 are wound with an elongated polypropylene separator therebetween, followed by press molding, whereby a flat wound electrode assembly 3 is prepared. The wound electrode assembly 3 includes the positive electrode core-exposed portion 4 wound at an end section in a winding axis and the negative electrode core-exposed portion 5 wound at another end section.

Attachment of Components to Sealing Plate

An outer insulating member 10 is provided on a battery outer surface around a positive electrode terminal-mounting hole (not shown) provided in a sealing plate 2. An inner insulating member 11 and a base portion 6c of a positive electrode current collector 6 are provided on a battery inner surface around the positive electrode terminal-mounting hole. A positive electrode terminal 7 is inserted into a through-hole in the outer insulating member 10, the positive electrode terminal-mounting hole, a through-hole in the inner insulating member 11, and a through-hole in the base portion 6c from a battery outer side. A leading end portion of the positive electrode terminal 7 is swaged to the base portion 6c. This allows the positive electrode terminal 7 and the positive electrode current collector 6 to be fixed to the sealing plate 2. A swaged portion of the positive electrode terminal 7 is preferably welded to the base portion 6c. The positive electrode current collector 6 includes a connection portion 6a connected to the positive electrode core-exposed portion 4 and a lead portion 6b connecting the connection portion 6a and the base portion 6c together in addition to the base portion 6c. The base portion 6c is located between the sealing plate 2 and the wound electrode assembly 3.

An outer insulating member 12 is provided on a battery outer surface around a negative electrode terminal-mounting hole (not shown) provided in the sealing plate 2. An inner insulating member 13 and a base portion 8c of a negative electrode current collector 8 are provided on a battery inner surface around the negative electrode terminal-mounting hole. A negative electrode terminal 9 is inserted into a through-hole in the outer insulating member 12, the negative electrode terminal-mounting hole, a through-hole in the inner insulating member 13, and a through-hole in the base portion 8c from a battery outer side. A leading end portion of the negative electrode terminal 9 is swaged to the base portion 8c. This allows the negative electrode terminal 9 and the negative electrode current collector 8 to be fixed to the sealing plate 2. A swaged portion of the negative electrode terminal 9 is preferably welded to the base portion 8c. The negative electrode current collector 8 includes a connection portion 8a connected to the negative electrode core-exposed portion 5 and a lead portion 8b connecting the connection portion 8a and the base portion 8c together in addition to the base portion 8c. The base portion 8c is located between the sealing plate 2 and the wound electrode assembly 3.

Attachment of Current Collectors to Wound Electrode Assembly

The connection portion 6a of the positive electrode current collector 6 is welded to the wound positive electrode core-exposed portion 4. The connection portion 8a of the negative electrode current collector 8 is welded to the wound negative electrode core-exposed portion 5. Resistance welding, ultrasonic welding, welding by the application of an energy beam such as a laser beam, and the like can be used for welding connection.

Assembly of Prismatic Secondary Battery

The wound electrode assembly 3 provided with the positive electrode current collector 6 and the negative electrode current collector 8 is covered with a resin sheet 14 and is then provided in a rectangular enclosure 1. The sealing plate 2 and the rectangular enclosure 1 are welded together such that an opening of the rectangular enclosure 1 is sealed with the sealing plate 2. Thereafter, a nonaqueous electrolyte solution is poured through an electrolyte solution-pouring hole provided in the sealing plate 2, followed by sealing the electrolyte solution-pouring hole with a sealing plug 16. This allows the prismatic secondary battery 20 to be manufactured.

The wound electrode assembly 3 is placed in the rectangular enclosure 1 such that a winding axis of the wound electrode assembly 3 is parallel to the bottom of the rectangular enclosure 1. The resin sheet 14 is placed between the rectangular enclosure 1 and the wound electrode assembly 3. The sealing plate 2 is provided with a gas release valve 15 that ruptures when the pressure in the rectangular enclosure 1 exceeds a predetermined value and that releases gas in the rectangular enclosure 1 outside the rectangular enclosure 1.

Modification

Figure 6:
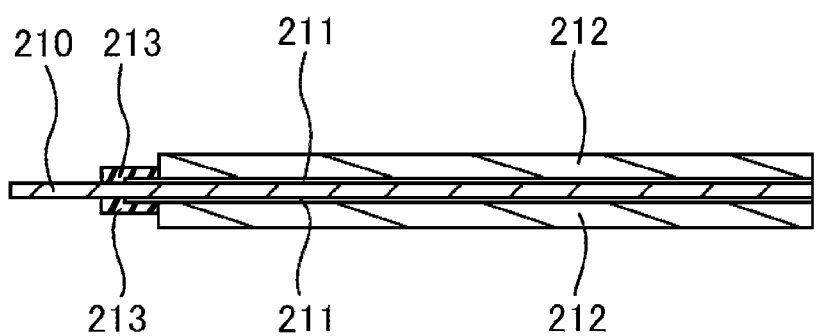
FIG. 6 is a sectional view of a positive plate according to a modification.

FIG. 6 is a sectional view of a positive plate according to a modification taken along a lateral direction thereof. As shown in FIG. 6, a positive electrode core 210 may be provided with protective layers 213. Each of the protective layers 213 is placed in the vicinity of an end portion of a corresponding one of positive electrode active material mix layers 212. The protective layers 213 have an electrical conductivity lower than that of the positive electrode active material mix layers 212 or are insulating. Each of conductive layers 211 is placed between the positive electrode core 210 and a corresponding one of the positive electrode active material mix layers 212.

The positive plate, which is shown in FIG. 6, can be manufactured by a method below. First, conductive layer slurry is applied to the positive electrode core 210. Thereafter, positive electrode active material mix layer slurry is applied to the conductive layer slurry. Protective layer slurry is applied to the positive electrode core 210 or the conductive layer slurry close to regions coated with the positive electrode active material mix layer slurry. The positive electrode active material mix layer slurry and the protective layer slurry are preferably applied at the same time. At least one portion of the protective layer slurry is preferably directly applied to the positive electrode core 210.

Others

In the above-mentioned examples, the positive plates have been described. The present invention can be applied to negative plates.

A material for a positive plate, a negative plate, a separator, an electrolyte solution, or the like may be a known one for use in secondary batteries. In the case of a nonaqueous electrolyte secondary battery, materials below are preferably used.

A positive electrode active material used is preferably a lithium-transition metal composite oxide. Examples of the lithium-transition metal composite oxide include lithium cobaltate, lithium manganate, lithium nickelate, lithium-nickel-manganese composite oxides, lithium-nickel-cobalt composite oxides, and lithium-nickel-cobalt-manganese composite oxides. Those obtained by adding Al, Ti, Zr, W, Nb, B, Mg, Mo, or the like to these oxides can be used. Alternatively, olivine-type iron lithium phosphate can be used.

In the case of applying the present invention to a positive plate, a positive electrode active material mix layer preferably contains the positive electrode active material, a binding agent, and a conductive material. The binding agent is particularly preferably polyvinylidene fluoride (PVdF). The conductive material is particularly preferably a carbon material. A positive electrode core is preferably made of aluminium foil or aluminium alloy foil.

In the case of applying the present invention to the positive plate, the compressed positive electrode active material mix layer preferably has a packing density of 2.4 $g/cm^3$ or more and more preferably 2.6 $g/cm^3$ or more.

A negative electrode active material used is preferably a carbon material capable of storing and releasing lithium ions or a non-carbonaceous material. Examples of the carbon material capable of storing and releasing lithium ions include graphite, non-graphitizable carbon, graphitizable carbon, fibrous carbon, coke, and carbon black. Among these materials, graphite is particularly preferable. Examples of the non-carbonaceous material include silicon, tin, alloys mainly containing silicon or tin, and oxides mainly containing silicon or tin.

A nonaqueous solvent (organic solvent) for use in a nonaqueous electrolyte may be at least one selected from the group consisting of carbonates, lactones, ethers, ketones, and esters. These compounds may be used in combination. An electrolyte salt for use in the nonaqueous electrolyte may be one generally used in conventional lithium ion secondary batteries. A separator used is preferably a porous separator made of a polyolefin.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method for manufacturing an electrode plate, comprising:
   a first application step of applying conductive layer slurry containing fibrous carbon to a surface of a core made of metal foil;
   a second application step of applying active material mix layer slurry containing an active material to the conductive layer slurry before the conductive layer slurry dries; and
   a drying step of drying the conductive layer slurry and the active material mix layer slurry,
   wherein the fibrous carbon contained in the conductive layer slurry has a fiber length-to-diameter ratio of 20:1 to 2,000:1 and the amount of the fibrous carbon, contained in the conductive layer slurry applied to the core surface, per unit are of the core is 0.05 $g/m^2$ to 0.20 $g/m^2$ after the first application step.

2. The method according to claim 1, wherein the conductive layer slurry contains a binding agent and a dispersion medium and the mass ratio of the binding agent to the fibrous carbon is 0.5:100 to 3:100.

3. The method according to claim 2, wherein the electrode plate is a positive plate and the binding agent is polyvinylidene fluoride.

4. The method according to claim 1, wherein in the first application step, the thickness of the conductive layer slurry applied to the core surface is 0.02 µm to 1 µm.

5. The method according to claim 1, further comprising a third application step of applying protective layer slurry to a portion of the core that is close to a region coated with the active material mix layer slurry, wherein the electrode plate is a positive plate, the protective layer slurry is dried in the drying step, the protective layer slurry contains inorganic particles and a binding agent, and the protective layer slurry does not contain the active material or has an active material content less than the content of the active material in the active material mix layer slurry.

6. The method according to claim 5, wherein at least one portion of the protective layer slurry is directly applied to the core.

7. A method for manufacturing a secondary battery using an electrode plate manufactured by the method according to claim 1, comprising:
   a step of preparing an electrode assembly using the electrode plate, another electrode plate different in polarity from the electrode plate, and a separator; and
   a step of providing the electrode assembly in a battery case.

* * * * *